United States Patent [19]

Arning

[11] Patent Number: 5,715,469
[45] Date of Patent: Feb. 3, 1998

[54] METHOD AND APPARATUS FOR DETECTING ERROR STRINGS IN A TEXT

[75] Inventor: Andreas Arning, Stuttgart, Germany

[73] Assignee: International Business Machines Corporation, Armonk, N.Y.

[21] Appl. No.: 273,295

[22] Filed: Jul. 11, 1994

[30] Foreign Application Priority Data

Jul. 17, 1993 [DE] Germany .......................... 43 23 241.8

[51] Int. Cl.$^6$ ............................ G06F 17/24; G06F 17/27
[52] U.S. Cl. ........................ 395/795; 395/793; 434/169
[58] Field of Search ...................... 364/419.12, 419.13, 364/419.14, 419.1, 419.15, 419.16; 395/600, 795, 803, 793; 434/167, 169

[56] References Cited

U.S. PATENT DOCUMENTS

| | | | |
|---|---|---|---|
| 4,164,025 | 8/1979 | Dubnowski et al. | 364/900 |
| 4,471,459 | 9/1984 | Dickinson et al. | |
| 4,671,684 | 6/1987 | Kojima et al. | 400/63 |
| 4,674,065 | 6/1987 | Lange et al. | 364/900 |
| 4,689,678 | 8/1987 | Klemmer | 358/164 |
| 4,718,094 | 1/1988 | Bahl et al. | 381/43 |
| 4,741,036 | 4/1988 | Bahl et al. | 381/43 |
| 4,773,009 | 9/1988 | Kucera et al. | |
| 4,777,617 | 10/1988 | Frisch et al. | 364/900 |
| 4,783,803 | 11/1988 | Baker et al. | 381/42 |
| 4,797,855 | 1/1989 | Duncan, IV et al. | |
| 4,868,750 | 9/1989 | Kucera et al. | |
| 4,903,206 | 2/1990 | Itoh et al. | |
| 5,033,087 | 7/1991 | Bahl et al. | |
| 5,159,552 | 10/1992 | Van Gasteren et al. | |
| 5,189,610 | 2/1993 | Kaplan et al. | |
| 5,258,909 | 11/1993 | Damerau et al. | |
| 5,305,205 | 4/1994 | Weber et al. | |

FOREIGN PATENT DOCUMENTS 0415000 5/1990 European Pat. Off.

OTHER PUBLICATIONS

"Treating Low Frequency Dictionary Words as Misspellings to Increase Correction Accuracy"; IBM Technical DisclosureBulletin, vol. 31, No. 11, Apr. 1989, pp. 430–431.

"Techniques for Automatically Correcting Words in Text", Caron Kukich, ACM Computing Surveys, vol. 24, No. 4, Dec. 1992.

"Word Hy–phen–a–tion by Com–put–er", Department of Computer Science, Stanford University, Aug. 1983, p. 11ff and references cited therein.

"File Searching Using Variable Length Keys", Rene de la Briandais, Proc. Western Joint Computer Conf. 15, 1959, pp. 295–298.

"Trie Menory", Edward Fredkin, CAM 3, Sep. 1960, pp. 490–500.

"The Art of Computer Programming", vol. 3, Section 6.2.1, Algorithm B, Addison–Wesley Publishing Company, 1973.

"The Art of Computer Programming", Donald E. Knuth, Addison–Wesley Publishing Company, 1973, Section 6.2.2, p. 422 ff., particularly Algorithm T.

*Primary Examiner*—Gail O. Hayes
*Assistant Examiner*—Joseph Thomas
*Attorney, Agent, or Firm*—Kenneth A. Seaman

[57] ABSTRACT

A system for checking the spelling of words and character strings without the need for a stored dictionary of words and the memory required thereby. The system selects an error-free string and modifies it according to one or more rules which change the error-free string to a possible error string. The rules creating the possible error string can modify the error-free string by predictable character manipulation to yield usual and common errors of the character string. The frequency of occurrence of both the error and error-free strings within the text are determined. These frequencies are compared to each other and, based upon the comparison, the system decides whether the possible error string is an actual error string. The system can use modifying rules which are psychological or technically related to the computer system or operator, and rules which correspond to errors common with specialized input methods, such as character and speech recognition.

17 Claims, 4 Drawing Sheets

METHOD AND APPARATUS FOR DETECTING ERROR STRINGS IN A TEXT

BACKGROUND OF THE INVENTION

1. Field of the Invention

The invention relates to a method and apparatus for detecting and/or correcting an error string in a text.

2. Prior Art

In known word processing systems, entered text is stored separate from a dictionary. The dictionary associated with a word processing system is a file that contains a reasonably complete list of known words and possibly their inflected forms, i.e., their conjugations and declinations. When searching for errors in entered text, each individual word is searched for in the dictionary. If a word is not contained in the dictionary, the word processing system issues an error message and asks the user to check the word. Such systems have been disclosed, for example, in U.S. Pat. Nos. 4,689,678, 4,671,684, and 4,777,617.

A word processing system has also been disclosed in U.S. Pat. No. 4,674,065, for example, which is based on a statistical N-gram analysis technique. When an incorrect word is detected, the user is offered a list of possible correct alternatives to select from.

An overview of known techniques for automatic correction of words in a text is provided by the publication "Techniques for Automatically Correcting Words in Text," by Caron Kukich, ACM Computing Surveys, Volume 24, No. 4, December 1992.

The known methods for error detection and correction share the characteristic that a dictionary separate from the text is used as the standard for comparison. The known systems thus require a relatively large amount of memory for storing the dictionary, and this memory is thus not available to other applications.

Further disadvantages of using a dictionary are that, in general, the dictionary itself contains some errors and thus may not be reliable as a standard. After all, the dictionary itself cannot be checked for errors by the word processing system, since a dictionary is considered to be the most reliable standard. Moreover, the dictionary may be continually updated, allowing additional errors to creep in. The use of known word processing systems is practically unsuitable for checking multilingual texts, since all "foreign words" not present in the dictionary will be flagged as errors. The same also holds true for monolingual texts which employ unusual words or newly-coined words, as well as for computer code or texts that contain phonetic information or formatting controls. In these cases, known word processing systems may flag a large number of correct strings as incorrect, since the strings do not occur in the dictionary. This problem is especially evident when the text being checked includes abbreviations or formulas or contains proper names that are not stored in the dictionary.

SUMMARY OF THE INVENTION

The invention is thus based on the objective of providing an improved method and apparatus for detecting and/or correcting an error string in a text.

With the invention, the storing of a dictionary is not required, so that the disadvantages previously described for the state of the art systems are largely eliminated. In contrast to known word processing systems, according to the invention, the text is not checked with respect to a dictionary but is rather itself subjected to a statistical analysis which serves as the basis for error detection. Here, external dictionaries are not required. The frequency of the error-free string, given by the user, in the text forms the basis for detecting error variants of the string. The frequency of the error-free string serves as a measure for the probability that a possible error string in the text is an actual error string corresponding to the error-free string. The error string identified in this manner, if it occurs more than once in the text, can then be replaced automatically by the corresponding error-free string throughout the entire text.

In one embodiment of the invention, the error-free string specified by the user and occurring in the text is modified according to at least one rule, so that one or more possible error strings are generated. In deciding whether a possible error string actually corresponds to an error-free string given by the user, the frequency of the possible error string in the text is determined. The frequencies of the error-free string and the possible error string are compared, and this comparison forms the basis for deciding whether the possible error string is an actual error string. The comparison of the frequencies uses the fact that a word occurring frequently in a text has, with high probability, been entered incorrectly at least once. Thus, the larger the ratio of the frequency of the error-free string to the frequency of the possible error string, the higher the probability that the possible error string is an actual error string.

To increase the effectiveness of this search for error strings in the text, in accordance with a preferred embodiment, the rule or rules used to modify the error-free string are selected such that psychological errors and/or error sources related to the computer system, in particular to its keyboard, are simulated. A keyboard-related error, for example, is pressing a key adjacent to the desired character. If, for example, due to the keyboard used, the character "b" frequently occurs in place of its neighbor "v", this can be allowed for in a corresponding rule. By applying the corresponding rule, a "v" occurring in the error-free string is replaced with "b", so that, from the error-free string, a possible error string is generated that, with high probability, also occurs in the text. For any one single error-free string, this procedure can be repeated using different rules to simulate different possible errors.

The probability that applying a specific rule will generate a possible error string that actually occurs in the text can, depending on the rule, vary with the user, the computer system used, or both. This probability can be subject to time-related variations, for example, because the user has learned to avoid certain kinds of errors, because a new user takes over and tends to make other kinds of errors, or because the computer system used is replaced with another, having another keyboard. This can be taken into consideration using a method of automated learning that registers the success probabilities of the rules employed. If the automated learning process shows that a rule leads particularly often to detecting an error string, this rule will be given preference and weighted with a factor. An initialization of these factors can also be determined using a training sequence.

In accordance with a further preferred embodiment, the entire text is automatically checked. Here, the frequencies of all unique strings in the text are first determined. The strings whose frequencies are higher than a specified threshold value are defined as error-free strings, since a string occurring very often in a text has a high probability of being correct. The error-free strings so defined, or their frequencies, then serve as the basis for error detection.

In accordance with a further preferred embodiment, the invention relates to a character recognition system comprising a system for automated optical character recognition. The system for automated optical character recognition can, for example, be used to enter a printed text into a computer system, where the raw text input to the computer system for the automated optical character recognition process is not error-free. On the one hand, this can result from the fact that the printed text contains errors or that the system for automated optical character recognition does not function without errors. The raw text entered into the computer system is checked by the computer system for errors, in accordance with the invention, so that in particular deficiencies in the system for automated optical character recognition can be corrected to a large extent. A method based on an N-gram technique for supporting an apparatus for character recognition is disclosed in U.S. Pat. No. 4,058,795.

In accordance with a further preferred embodiment, the invention relates to a system for automatic recording of dictation, comprising a speech recognition system. Speech recognition systems as such have been disclosed, for example, in U.S. Pat. Nos. 4,783,803; 4,741,036; 4,718,094; and 4,164,025.

The Speech recognition system generates a raw text, generally exhibiting errors, which is entered into a computer system. Using the computer system, the error detection and/or correction provided by the invention finds application.

In accordance with a further preferred embodiment, the invention relates to a storage medium suited for use in a programmable computer system. Through a physical and/or chemical process, a program is recorded on the storage medium for carrying out the inventive method. Through this physical and/or chemical process, the storage medium acquires the characteristic of being able to interact with the programmable computer system such that the computer system, otherwise programmable for general purposes, is transformed into a computer system according to the invention.

Other objects and advantages of the present invention will be apparent to those skilled in the art in view of the following detailed description of the drawings, appended claims, and the accompanying drawings.

Embodiments of the invention are represented in the drawings and are discussed in more detail in the following.

DETAILED DESCRIPTION OF THE DRAWINGS

Figure 1:
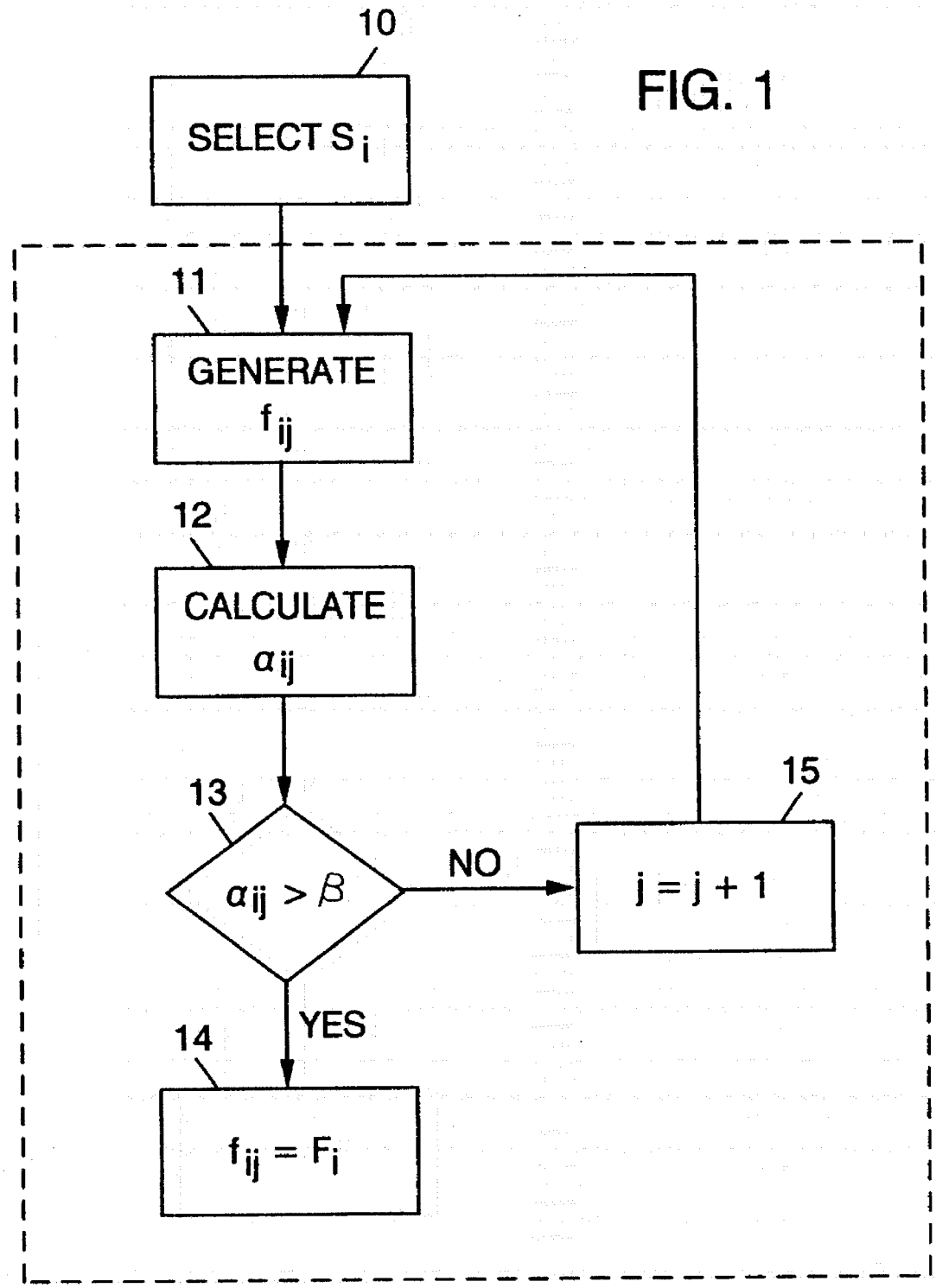
FIG. 1 shows a schematic block diagram of a first embodiment of the present invention.

The block diagram shown in FIG. 1 refers, for example, to a word processing system according to the present invention, into which a text to be checked has already been entered. In step 10, the user selects an error-free string $S_i$ occurring in the text. The object of the inventive method is then to detect at least one error string $F_i$ in the text corresponding to the selected error-free string $S_i$, i.e., representing, for example, a typographical error when compared with the error-free string $S_i$.

Next, in step 11, a possible error string $f_{ij}$ is generated. The possible error string $f_{ij}$ is produced from the error-free string $S_i$ by applying rule $R_j$. In step 11, by use of rule $R_j$ preferably on different letters and/or letter positions, multiple possible error strings $f_{ij}$ are generated from the error-free string $S_i$.

In step 12, a value $\alpha_{ij}$ is calculated as the comparison of the frequency $H(s_i)$ of the error-free string $S_j$ and the frequency $H(f_{ij})$ of the possible error string $f_{ij}$ In step 13, the value $\alpha_{ij}$ calculated in step 12 is compared with a threshold value $\beta$. If $\alpha_{ij} > \beta$, the search result is declared in step 14 to be that the possible error string $f_{ij}$ is an actual error string $F_i$. This result can be used for automatic correction of all strings $F_i$ occurring in the text. Prior to this correction, the results so obtained can be presented to the user for verification. In this case, the automatic correction is carried out only if the user agrees with the proposed result.

If the condition $\alpha_{ij} > \beta$ is not true, the index j in step 15 is incremented by 1. The result of this is that in the next step 11 for generating another possible error string, another rule $R_{j+1}$ is applied. The additional possible error string $f_{i+1,j+1}$ so generated represents an additional candidate, which could correspond to an error string $E_i$. This determination is again made in the subsequent steps 12 and 13, and, if applicable, the result is declared in step 14.

According to the flow diagram in FIG. 1, the method is then terminated as soon as an error string $F_i$ is determined in step 14. It can also happen, however, that, in this case too, additional possible error strings $f_{ij}$ can be formed by applying other rules $R_j$. This corresponds to the steps 15 and 11 described above. In this way, still more error strings $F_i$ can be found that, for example, have arisen through other entry errors with respect to the error-free string $S_i$ selected in step 10.

In this case, it is also possible that initially in several sequential steps 14, different error strings $F_i$ are defined as results of the search and these error strings are presented to the user sorted by the corresponding $\alpha_{ij}$ values. Since the $\alpha_{ij}$ values represent a measure of the probability that a possible error string $f_{ij}$ is an actual error string $F_i$ occurring in the text, the results are therefore shown to the user sorted by their probability.

In contrast to known dictionary or N-gram based systems, the basis for the error detection is not externally stored data—such as in the form of a separately stored dictionary—but rather the text itself being checked. In accordance with the invention, the otherwise externally stored data is derived from the text being checked by determining the frequency $H(s_i)$. If the frequency $H(s_i)$ assumes high values, the invention leads to the conclusion that a possible error string $f_{ij}$ occurring relatively seldom in the text represents an actual error string $F_i$. Here, externally stored data and the attendant expenditure are not required.

The rules $R_j$ employed in step 11 for generating the possible error strings $f_{ij}$ are preferably selected such that psychological errors and/or other error sources related to the computer system, in particular to its keyboard, are simulated. Psychological errors are those, for example, that are difficult to find when copy editing, such as errors in particularly long words. A keyboard-related error is, for example, one caused by inadvertent bouncing, producing a double letter. Inadvertent multiple entry or omission of a character at the keyboard can also occur if the keyboard exhibits a poorly defined action point.

The calculation in step 12 of the value $\alpha_{ij}$ can be performed based on the computing rule $$\Phi_{ij}(H(f_{ij}),H(_{Si}))=\alpha_{ij} \quad (1)$$

This computing rule can preferably have the form $$\phi_{ij}(H(f_{ij}),H(S_i)) = \left( \frac{H(S_i)}{H(f_{ij})} \cdot \Psi \right)^\kappa \quad (2)$$

where $\Phi_{ij}$ is a function dependent on the frequency $H(f_{ij})$ and the frequency $H(_{Si})$, the value $\Psi$ is a factor, and the value $\kappa$ represents an exponent.

The factor $\Psi$ can be calculated according to the formula $$\Psi=[L(S_i)]^p \quad (3)$$

where, using the function L, the length of the string $_{Si}$, or in other words, the number of characters in string $S_i$ is determined. The value p represents an exponent that is preferably quadratic or cubic.

The quotient contained in equation (2) is the key element in computing the value $\alpha_{ij}$. The reason for this is that this quotient increases with increasing frequency of the error-free string $S_i$ and decreasing frequency of the generated possible error string $f_{ij}$ in the text. This quotient is based on the experience that a string occurring with high frequency in a text has a high probability of being correct, and that furthermore the probability that the applicable string also occurs in the text at least once in error—e.g., due to an entry error—increases with the frequency of the error-free string in the text. Using this correction factor $\Psi$ can also take into account that with increasing string length, the probability that the string contains an error increases, in particular too because errors in long strings are generally not easily recognized by the user. Furthermore, the factor $\Psi$ takes into consideration that with increasing word length the probability decreases that a modification of the error-free string $S_i$ using a rule $R_j$ will lead to another error-free string $S_i$ occurring in the text. This has particularly strong influence on the calculation of the value $\alpha_{ij}$, in case a value such as 2 or 3 is chosen for the exponent p. The value $\kappa$ in the embodiment of FIG. 1 has the value 1. If the value is chosen as −1, only the condition $\alpha_{ij}<\beta$ in step 13 need be replaced by $\alpha_{ij}<\beta$. For simplified representation, only the case $\kappa=1$ will hereafter be considered, without loss of generality.

The value $\alpha_{ij}$ calculated using equation (2) thus increases with the probability that a possible error string $f_{ij}$ is an actual error string $F_i$. In step 13, a check is therefore made whether the result based on comparing the frequencies $H(_{Si})$ and $H(f_{ij})$ provides a sufficient measure of safety for the definition of a result in step 14. The choice of the corresponding threshold value $\beta$ hereby depends on the requirements of the user: a high threshold value means that the result determined in step 14 is almost certainly correct, while possible error strings $f_{ij}$ that also lead to a correct result are discarded in step 13. The opposite is true if a low value is chosen for the threshold value $\beta$.

The following table shows several examples of possible rules $R_j$. Also, for each rule an example is given with an error-free string $S_i$, the corresponding possible error string $f_{ij}$, and the related value $\alpha_{ij}$. Following the strings $S_i$ and $f_{ij}$, their corresponding frequencies in the examined text are given. The text is from the sports sections of the "Frankfurter Rundschau" newspaper for 1988.

TABLE 1

| | |
|---|---|
| Rule $R_1$: | Transposition of two successive letters. |
| Example: | |
| $f_{11}=$ | "Olmypischen"(1) |
| $S_1=$ | "Olympischen"(875) |
| $\alpha_{11}=$ | 1164625 |
| Rule $R_2$: | Omission of a letter occurring at least twice. |
| Example: | |
| $f_{22}=$ | "Präsidumssitzung"(1) |
| $S_2=$ | "Präsidiumssitzung"(7) |
| $\alpha_{22}=$ | 40824 |
| Rule $R_3$: | Omission of a letter occurring at most once. |
| Example: | |
| $f_{33}=$ | "Diziplinen"(1) |
| $S_3=$ | "Disziplinen"(89) |
| $\alpha_{33}=$ | 118549 |
| Rule $R_4$: | Doubling of a letter. |
| Example: | |
| $f_{44}=$ | "Baskettball"(2) |
| $S_4=$ | "Basketball"(179) |
| $\alpha_{44}=$ | 89500 |
| Rule $R_5$: | Replacement of a letter. |
| Example: | |
| $f_{55}=$ | "Golopprennbahn"(1) |
| $S_5=$ | "Galopprennbahn"(34) |
| $\alpha_{55}=$ | 93296 |
| Rule $R_6$: | Insertion of a letter not previously occurring in the word. |
| Example: | |
| $f_{66}=$ | "Wiederanspfiff"(1) |
| $S_6=$ | "Wiederanpfiff"(47) |
| $\alpha_{66}=$ | 103259 |
| Rule $R_7$: | Insertion of a letter previously occurring in the word. |
| Example: | |
| $f_{77}=$ | "Ablöseseumme"(1) |
| $S_7=$ | "Ablösesumme"(91) |
| $\alpha_{77}=$ | 157248 |
| Rule $R_8$: | Doubling of an incorrect letter, here: LEFT-HAND neighbor. |
| Example: | |
| $f_{88}=$ | "Spvvg"(4) |
| $S_8=$ | "Spvgg"(142) |
| $\alpha_{88}=$ | 4435 |
| Rule $R_9$: | Doubling of an incorrect letter in a word, here: RIGHT-HAND neighbor. |
| Example: | |
| $f_{99}:=$ | "Sperrwerfen"(1) |
| $S_9:=$ | "Speerwerfen"(19) |
| $\alpha_{99}=$ | 25289 |
| Rule $R_{10}$: | INSTEAD of the desired letter, RIGHT-HAND neighbor was pressed. |
| Example: | |
| $f_{10\ 10}=$ | "erfolgteich"(1) |
| $S_{10}=$ | "erfolgreich"(290) |
| $\alpha_{10\ 10}=$ | 385990 |
| Rule $R_{11}$: | IN ADDITION TO the desired letter, RIGHT-HAND neighbor was pressed; insertion BEFORE intended letter. |
| Example: | |
| $f_{11\ 11}=$ | "Cjhristian"(1) |
| $S_{11}=$ | "Christian"(175) |
| $\alpha_{11\ 11}=$ | 127575 |
| Rule $R_{12}$: | IN ADDITION TO the desired letter, RIGHT-HAND neighbor was pressed; insertion AFTER intended letter. |
| Example: | |
| $f_{12\ 12}=$ | "Verletzunmg"(1) |
| $S_{12}=$ | "Verletzung"(153) |
| $\alpha_{12\ 12}=$ | 153000 |
| Rule $R_{13}$: | INSTEAD OF the desired letter, LEFT-HAND neighbor was pressed. |
| Example: | |
| $f_{13\ 13}=$ | "Problene"(1) |
| $S_{13}=$ | "Probleme"(290) |
| $\alpha_{13\ 13}=$ | 148480 |
| Rule $R_{14}$: | IN ADDITION TO the desired letter, LEFT-HAND neighbor was pressed; insertion BEFORE intended letter. |

TABLE 1-continued

Example:
$f_{14\ 14}$ = "Hoffnungsträgwer"(1)
$S_{14}$ = "Hoffnungsträger"(18)
$\alpha_{14\ 14}$ = 73728
Rule $R_{15}$: IN ADDITION TO desired letter, LEFT-HAND neighbor was pressed; insertion AFTER intended letter.
Example:
$f_{15\ 15}$ = "Qualkifikation"(1)
$S_{15}$ = "Qualifikation"(255)
$\alpha_{15\ 15}$ = 560235
Rule $R_{16}$: Capitalization error on FIRST letter.
Example:
$f_{16\ 16}$ = "olympiastadion"(1)
$S_{16}$ = "Olympiastadion"(5)
$\alpha_{16\ 16}$ = 13720
Rule $R_{17}$: Capitalization error on SECOND letter.
Example:
$f_{17\ 17}$ = "SChwalbach"(1)
$S_{17}$ = "Schwalbach"(38)
$\alpha_{17\ 17}$ = 38000
Rule $R_{18}$: Omission of a double letter, leaving only single letter.
Example:
$f_{18}$ = "Etapensieger"(1)
$S_{18}$ = "Etappensieger"(37)
$\alpha_{18\ 18}$ = 81289
Rule $R_{19}$: Doubling of a doubled letter, thus tripling it.
Example:
$f_{19\ 19}$ = "UdSSSR"(1)
$S_{19}$ = "UdSSR"(740)
$\alpha_{19\ 19}$ = 92500

The rules $R_j$ are optimally selected when essentially only those variants best corresponding to the observed error types are generated in step 11. Here, the following rules have proven themselves: rule $R_1$ (transposition of two successive letters: from "abcba", "bacba", "acbba", "abbca" and "abcab"), rule $R_2$ (omission of a letter occurring at least twice, i.e., omission of individual letters, but only those which otherwise occur at least once: from "abcba", "bcba", "acba", "abca", and "abcb", and rule $R_7$ (insertion of individual letters, but only those which otherwise occur at least once: from "abc", "aabc", "abac", "abca", "babc", "abbc", "abcb", "cabc", "acbc", "abcc", but not "abdc" or the like).

Rule $R_2$ serves primarily to simulate a possible psychological error source. Omissions of letters occur very easily during manual entry but are more difficult to find during copy editing if the omitted letter occurs again in the string—because it is then not "missed" so much.

On the other hand, rules $R_{10}$ to $R_{15}$ serve to simulate technical deficiencies of the entry method employed—in this case a keyboard. The technical deficiency of the keyboard makes itself evident in this example in ergonomically unfavorable formation of the keys, so that adjacent keys are frequently pressed by mistake.

A further possible rule is the replacement of optically similar letters in the error-free string, e.g., replacement of "c" by "e". In a word processing system according to the invention, use of this rule can simulate error sources arising from technical deficiencies—such as insufficient resolution of the screen used to display the text. In a character recognition system in accordance with the invention, this and other rules can simulate technical deficiencies of the system for automated optical character recognition, since optically similar letters are often not correctly recognized by such systems. In the same way, in a system for automatic recording of dictation, in accordance with the invention, technical deficiencies in the associated speech recognition system can be simulated. Applying the corresponding rules, phonetically similar letters are transposed, e.g., "m" with "n", since speech recognition systems often produce such errors. Of course, the rules mentioned can apply not only to words but also to strings of any construction.

In calculating the value $\alpha_{ij}$ in step 12, a dictionary—based method can be used in addition. The possible error string $f_{ij}$ is then additionally checked using the dictionary—based method. If the string $f_{ij}$ is contained in the dictionary, i.e., if it is a valid string $G_i$, this would initially indicate that the possible error string $f_{ij}$ is not in error. However, this is in no way certain, since an error in the corresponding error-free string $S_i$ can by chance also lead to a valid string Gi, i.e., the possible error string $f_{ij}$ can occur in the dictionary as valid string $G_i$ in addition to being an error string $F_i$. Of course, as noted, a certain probability exists that a possible error string $f_{ij}$ occurring as a valid string $G_i$ in the dictionary is not an actual error string $F_i$. This can be taken into account in the calculation of $\alpha_{ij}$ by modifying the value $\alpha_{ij}$ from equation (2) if the string $f_{ij}$ is a valid string $G_i$. The modification can be done by multiplying the value from equation (2) by a factor between 0 and 1. The factor 0 here signifies that a valid string $G_i$ is defined unconditionally as error-free. In this case, however, an advantageous characteristic of the inventive method would be lost, namely consideration of the context. Using the inventive method, the word "director" in a manual for data processing was determined to be a possible error variant of the word "directory", although the word "director" is valid. Taking context into account is implicit in the inventive method, since the frequencies $H(_{si})$ and $H(f_{ij})$ are compared with each other. The factor is advantageously chosen to be significantly greater than 0.

The calculation of the value $\alpha_{ij}$ in step 12 can be further influenced by a method for automated learning. The method for automated learning assigns a factor $\delta_j(B)$ to an applied rule $R_{ij}$. The factor $\delta_j(B)$ is variable and can be influenced on the one hand by the user and on the other hand by the type of hardware used. If the application of a rule $R_j$ leads with above average frequency to finding an error in the text, the method for automated learning assigns the rule $R_j$ a corresponding factor $\delta_j(B)$ greater than 1. In the opposite case, the method for automated learning assigns the rule a factor less than 1. The value $\alpha_{ij}$ determined in step 12 from equation (2) is thus additionally multiplied by the factor $\delta_j(B)$ associated with the applied rule $R_{ij}$, so that the different success probabilities of the rules $R_j$ are considered in the calculation of $\alpha_{ij}$. The rules $R_j$ can be sorted according to their factors $\delta_j(B)$ such that the rules $R_j$ with the highest probability of success, to which a relatively large factor $\delta_j(B)$ is assigned, are applied first in step 11. If the inventive method is conducted fully automatically, i.e., without displaying the detected errors as suggestions to the user, the definition in step 14 is the key for the method of automated learning. If a suggestion is given to the user, his acceptance of a string proposed as being in error is the key for the method of automated learning and thus for determining the factors $\delta_j(B)$. The method for automated learning can, for example, be implemented with a neural network, possibly in conjunction with an expert system.

By using a system for automated learning, a user- and/or hardware-specific calibration can be implemented. For example, the transposition of "y" and "z", such as in "Szstem", can be expected only with those users who continually switch between German and American keyboards, but not with authors of newspaper copy, who generally work with only one type of keyboard. Since there are also corresponding word pairs which do not represent errors, for example "Holy" and "Holz", it is useful to consider such transpositions as possible errors only if they are reasonable for the application area. A hardware-related type of error that can be allowed for through the method of automated learning is, for example, the inadvertent simultaneous depression of two adjacent keys on the keyboard, such as in "Sysrtem". The probability of this type of error will depend on the keyboard used—in particular its action point and any generation of an acoustical signal when pressing a key. Furthermore, the method of automated learning can also allow for the use, prior to the inventive method, of other spell-check methods which detect certain error types with difficulty. Those rules $R_j$ which simulate these error types then are assigned a particularly heavy weighting via the factor $\delta_j(B)$.

The user- and/or hardware-specific calibration can also result by direct entry of the user- and/or hardware-specific weighting factors $\delta_j(B)$. The factors $\delta_j(B)$ associated with a specific user, specific hardware, or a specific combination of user and hardware, can then be stored in separate data sets. If the user and/or hardware changes, the current set of factors $\delta_j(B)$ is replaced by the set of factors $\delta_j(B)$ associated with the new user and/or the new hardware, so that the latter set becomes the current one. The current set of factors $\delta_j(B)$ serves to weight the values obtained from equation (2) in step 12. The value $\alpha_{ij}$ is thus obtained by multiplying the value obtained from equation (2) with the factor $\delta_j(B)$ associated with the applied rule $R_j$. The current set of factors $\delta_j(B)$ thus obtained can also serve as a set of initial values for the factors $\delta_j(B)$ for the method of automated learning, so that the method can start off with user- and/or hardware-specific weighting factors $\delta_j(B)$, which can then be further optimized automatically. If the user and/or hardware changes, the optimized set of factors $\delta_j(B)$ can be stored for later use as initial values.

In addition, it is beneficial to provide an exception table, in which frequent word pairs such as form/from or three/there are stored. Proper names can also be stored in this table, e.g., Helmut/Hellmut or Hausmann/Haussmann, which could also arise from typographical errors, so that these words are not regarded as possible error strings in step 12. For a possible error string $f_{ij}$ generated in step 11, a check is made whether this string $f_{ij}$ is present in the exception table. If so, the next step executed will be 15 rather than 12.

Figure 2:
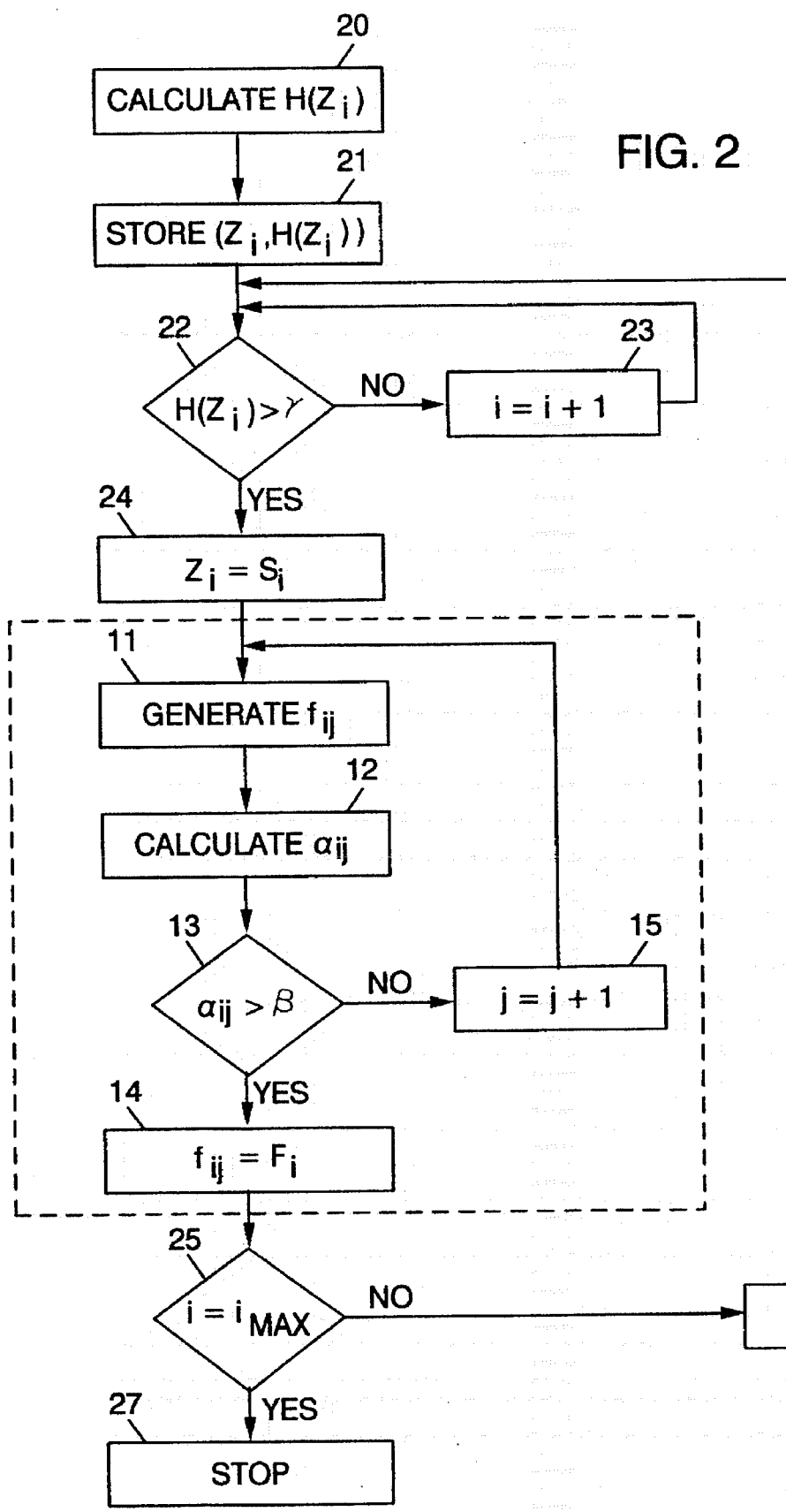
FIG. 2 shows a schematic block diagram of a second embodiment of the present invention.

FIG. 2 shows the flow diagram of a second preferred embodiment of the invention. In step 20, the frequency $H(Z_i)$ of each string $Z_i$ occurring in the text is first determined. In this case, each unbroken sequence of letters and/or any other characters, depending on the application, can be defined as a string $Z_i$.

In step 21, the occurring strings $Z_i$ and their corresponding frequencies $H(Z_i)$ are stored pairwise in a table. In step 22, the condition $H(Z_i)>\delta$ is tested. The value $\delta$ is a threshold value for the frequency $H(Z_i)$, above which the corresponding string $Z_i$ is defined to be an error-free string $S_i$. If, therefore, the frequency $H(Z_i)$ of a specific string $Z_i$ exceeds the threshold value $\delta$, this specific string $Z_i$ is defined as an error-free string $S_i$. The basis for this is that a string occurring relatively often in a text is with high probability an error-free string or a correctly spelled word of the applicable language.

If the condition $H(Z_i)>\delta$ in step 22 is not satisfied, the next step executed is 23, in which the index i is incremented by one. In the subsequent step 22, the condition $H(Z_{i+1})>\delta$ is tested for another string.

If the condition $H(Z_i)>\delta$ is satisfied by a string $Z_i$, step 24 is executed next. In step 24, the corresponding string $Z_i$ is defined as an error-free string $S_i$. The subsequent steps 11, 12, 13, 14, 15 correspond to the steps of the embodiment discussed with reference to FIG. 1. Step 24 thereby replaces the function of step 10 in the first embodiment, namely the selection of a specific error-free string $S_i$. All possible variations previously discussed with respect to the first embodiment are also possible in the second embodiment.

After completing the search for error strings $F_i$ of the string $S_i$ defined as error-free in step 14, the condition $i=i_{max}$ is tested in step 25. If index i has reached the maximum value $i_{max}$, all strings $Z_i$ occurring in the text have been examined, so that the process is terminated in step 27.

If the condition $i=i_{max}$ is not yet satisfied, the index i is incremented by 1 in step 26, and in step 22 the condition $H(Z_{i+1})>\delta$ is again checked for another string $Z_i$.

Step 12 for computing the value $\alpha_{ij}$ can advantageously be carried out by obtaining the frequency $H(f_{ij})$ from the table stored in step 21, so that the calculation is accelerated. If a possible error string $f_{ij}$ is not present in the table, its frequency is 0. In this case, step 15 can be executed without further evaluation, so that another rule $R_j$ can be applied to generate another possible error string.

The result used in step 14 can be used for automatic correction, as previously discussed with reference to FIG. 1. It can be beneficial, however, to store all results obtained in step 14 and, after executing step 27, sort them by the corresponding values of $\alpha_{ij}$. The user is then presented with a result list from which he can accept or reject individual results for automatic correction. Since the list is sorted by the values $\alpha_{ij}$, the most reliable results are shown first. If the threshold value β was selected relatively large, however, this procedure is not necessary, since in general practically all results obtained in step 14 can be used, so that an automatic correction can take place immediately without user intervention.

To limit execution time of the process, e.g., because only a certain amount of computing time is available, the method can be terminated prematurely if a defined number of errors have already been found or a certain portion of computing time has been expended. To accelerate the process, the generation of possible error strings $f_{ij}$ can be controlled such that all rules $R_j$ are applied only if the frequency $H(_{Si})$ for the error-free string $S_i$ associated with a possible error string $f_{ij}$ is high. In general, this expenditure will be worthwhile only if the frequency $H(_{Si})$ is very high. A high $H(_{Si})$ frequency implies a large statistical sample set, so that the reliability of the result in step 14 increases. In the case of lower $H(_{Si})$ frequencies, the set of rules $R_j$ used for detecting an error string $F_i$ associated with an error-free string $S_i$ can be limited accordingly, so that steps 11 to 15 are executed faster overall.

If prior to executing step 22 the table generated in step 21 is sorted, e.g., in alphabetical order, further acceleration results. The search of the table for a possible error string $f_{ij}$ for calculating the value $\alpha_{ij}$ in step 12 can then be carried out as a binary search. The binary search method is well-known, e.g., from Donald E. Knuth, "The Art of Computer Programming," Vol. 3, Section 6.2.1, Algorithm B, Addison-Wesley Publishing Company, 1973.

Figure 3:
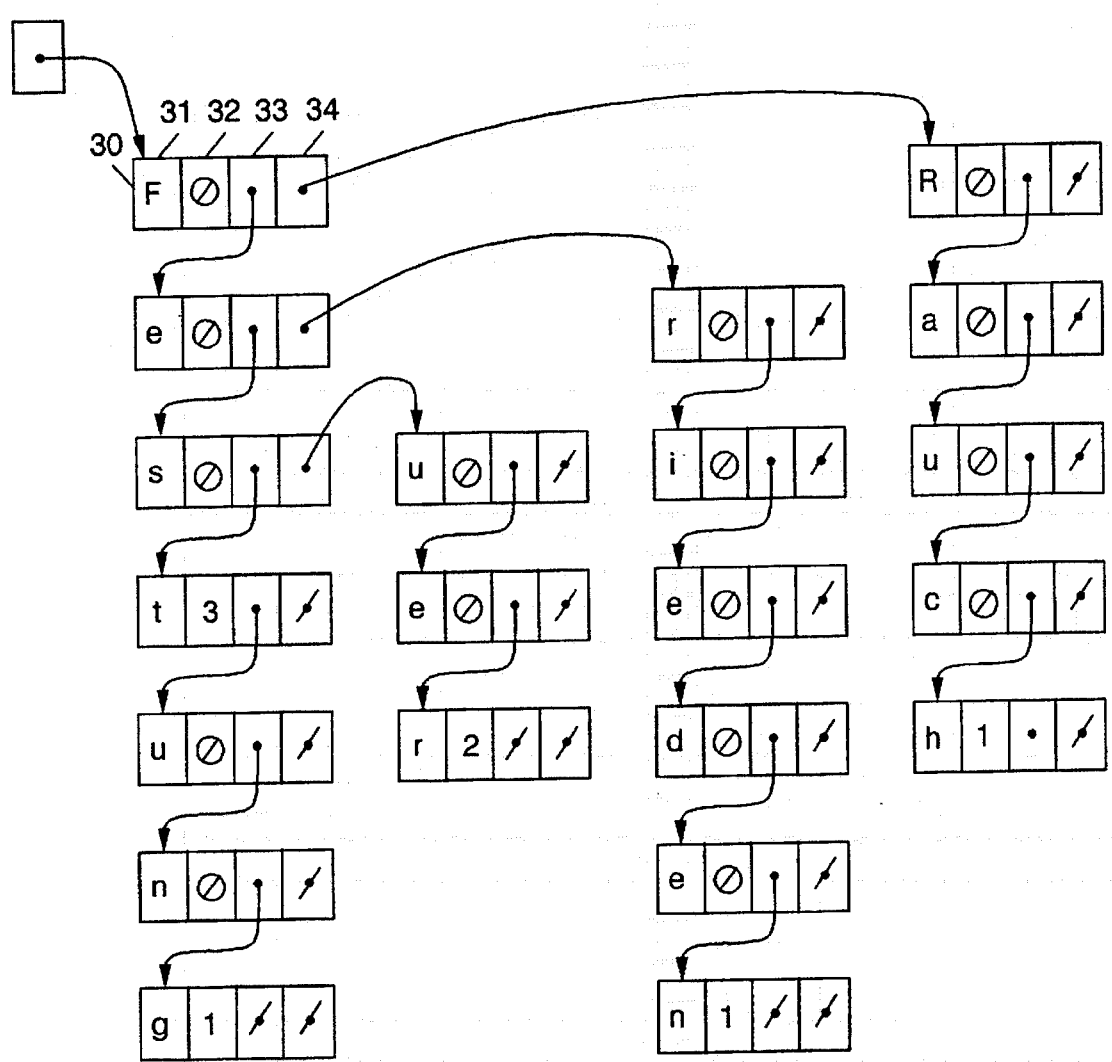
FIG. 3 shows a representation of a preferred storage structure for storing strings in accordance with the present invention.

In FIG. 3, a further possibility for storing the table generated in step 21 is shown. The tree structure depicted in FIG. 3 is generally described in the literature as a "linked tree", of. Franklin Mark Liang, "Word Hyphenation by Computer", Department of Computer Science, Stanford University, August 1983, pp. 11ff. and the references cited therein; de la Briandais, Rene, "File searching using variable length keys," Proc. Western Joint Computer Conf. 15, 1959, pp. 295–298; and Fredkin, Edward, "Tree memory," CACM 3, September 1960, pp. 490–500. In this example, the tree consists of nodes 30, whereby each node 30 contains entries 31 through 34. Entry 31 contains a letter or symbol, entry 32 contains the frequency $H(Z_i)$ of the corresponding string $Z_i$, entry 33 is a pointer to a child if—present—of node 30, and entry 34 is a pointer to a sibling —if present—of node 30. Entry 32 in a node 30 is nonzero if the string from the highest level of the tree to the node 30 occurs in the text. An example is shown in FIG. 3 on the basis of a text that contains only the words "Festung", "Feuer", "Rauch", "Frieden", and "Fest", whereby the word "Feuer" occurs twice and the word "Fest" occurs three times in the text. The remaining words each occur only once in the text.

This type of storing of the table in step 21 has the advantage of requiring less storage space and providing added acceleration to the process. The structure of the "linked tree" can occur in parallel with determining the individual strings $Z_i$ and their frequencies, so that subsequent sorting is unnecessary. The applicable algorithm has been specified by Knuth (Donald E. Knuth, "The Art of Computer Programming," Addison-Wesley Publishing Company, 1973, Section 6.2.2, pp. 422 ff., particularly Algorithm T).

Figure 4:
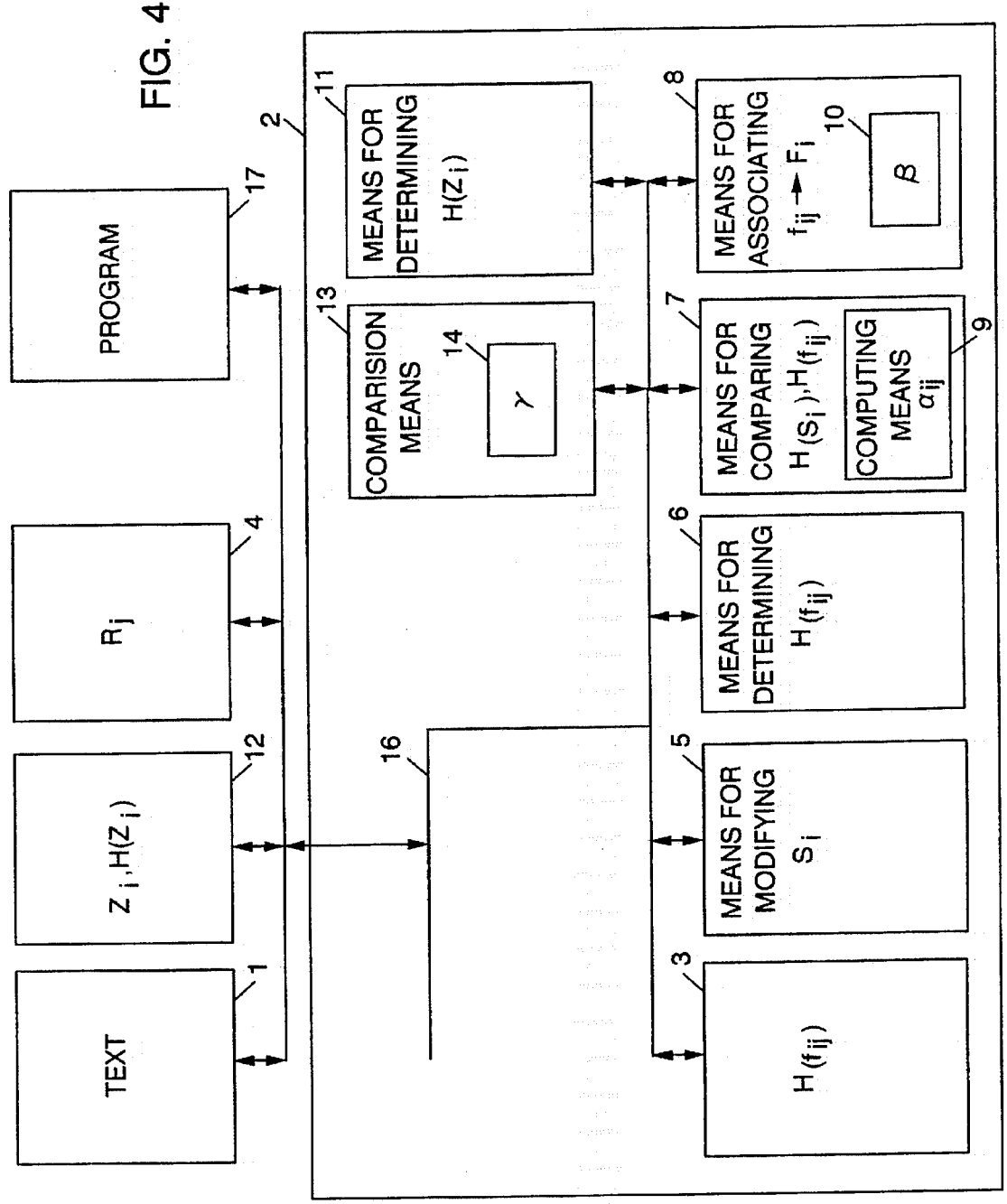
FIG. 4 shows a computer system in accordance with the present invention.

FIG. 4 shows an embodiment of a computer system in accordance with the invention. The computer system comprises storage means 1 for storing the text to be checked; storage means 12 for storing the frequencies $H(Z_i)$, or, in other words, for storing the table or tree structure established in step 21 (cf. FIG. 2 and FIG. 3); storage means 4 for storing rules $R_j$ used in step 11 for generating the possible error strings $f_{ij}$ (cf. FIG. 1 and FIG. 2); and processor means 2 for process control. The processor means 2 employ the frequency $H(_{Si})$ of the error string $F_i$ for detecting the error string $F_i$. The storage means 1, 4, 12 and the processor means 2 are interconnected via a bus 15, so that the processor means can access the different storage means. In this embodiment, the processor means contain storage means 3 for storing a frequency $H(f_{ij})$ needed to compute the value $\alpha_{ij}$ in step 12; means 5 for modifying an error-free string $S_i$ in accordance with a rule $R_j$, whereby a possible error string $f_{ij}$ can be generated according to step 11; means 6 for determining the frequency $H(f_{ij})$; means 7 for comparing the frequencies $H(f_{ij})$ and $H(_{Si})$; means 8 for associating the possible error string $f_{ij}$ with the error string $F_i$; means 11 for determining the frequency $H(Z_i)$ of various strings $Z_i$ in the text; and comparison means 13 for comparing the threshold value $\delta$ with a frequency $H(Z_i)$. The means 3, 5, 6, 7, 8, 11, 13 are interconnected via a processor-internal bus 16. The means 3, 5, 6, 7, 8, 11, and 13 Contained in the processor means 2, as well as bus 16, need not be discrete electronic components but can rather be generated via appropriate programming of processor 2. Such a program suitable for implementing the inventive method will interact with the control program of the computer system in a well-known manner such that the computer system assumes the configuration shown in FIG. 4.

The means 6 for determining the frequency $H(f_{ij})$ interact via the bus 16 and 15 with means 12 such that the desired frequency $H(f_{ij})$ can be derived from means 12, if this frequency is stored there. If there is no entry for the possible error string $f_{ij}$ in the table stored in means 12, the frequency $H(f_{ij})$ is zero. The determination of the frequency is needed to calculate the value $\alpha_{ij}$ in step 12.

The means 7 for comparing the frequencies $H(_{Si})$ and $H(f_{ij})$ contain computing means 9 for computing the value $\alpha_{ij}$ in accordance with the computing rule $$\Phi_{ij}(H(f_{ij}),H(_{Si}))=\alpha_{ij} \quad (1)$$

This corresponds to the comparison of the frequencies $H(_{Si})$ and $H(f_{ij})$ carried out in step 12 in computing the value $\alpha_{ij}$.

The means 8 for associating the possible error string $f_{ij}$ to the error string $F_i$ contains means 10 for storing the threshold value $\beta$ for a comparison with the value $\alpha_{ij}$. The value $\alpha_{ij}$ determined for comparison by means 7 is transferred via bus 16 to associating means 8. Associating means 8 process the value $\alpha_{ij}$ in accordance with steps 13 and 14.

The means 11 for determining the frequency $H(Z_i)$ interact with the means 1 to identify individual strings $Z_i$ in the text and to calculate the corresponding frequencies $H(Z_i)$, in accordance with step 20.

The comparison means 13 include means 14 for storing the threshold value $\delta$. The comparison means 13 interact with means 11 to define those strings $Z_i$ as error-free strings $S_i$ whose frequency $H(Z_i)$ exceeds the threshold value $\delta$. Using appropriate control by a program 17, the computer system in accordance with the invention can thereby carry out the procedure of FIG. 1 and. FIG. 2. The program can be stored in the means 17 for program control, whereby the means 17 for program control interact with the processor means 2 via bus 15.

Using the computer system in accordance with the invention, the sports sections of the "Frankfurter Rundschau" newspaper for 1988 were examined. The corresponding text consists of 1,671,136 words, of which 77,745 are unique. The computer system calculated 5,849 possible error strings $f_{ij}$, of which 643 are actual error strings $F_i$. The rules $R_j$ indicated in Table 1 were applied, whereby the application of rules $R_2$ and $R_3$ alone resulted in detecting 295 different actual error strings $F_i$.

Of course, many modifications of the foregoing description of the present invention are possible without departing from the spirit of the invention. Further, portions of the present invention can be used to advantage without the corresponding use of other parts of the description. Accordingly, the foregoing description of the present invention should be considered as merely illustrative of the present invention and not in limitation thereof.

Having thus described the invention, what is claimed is:

1. A method for detecting an error string $F_i$ in a text using a computer system, the steps of the method comprising:

storing an error-free string $S_i$ in the computer system, modifying the error-free string $S_i$ in accordance with a stored rule $R_j$, to generate a possible error string $f_{ij}$, storing the possible error string $f_{ij}$ in the computer system, determining the frequency $H(S_i)$ of the corresponding error-free string $S_i$ in said text, determining the frequency $H(f_{ij})$ of the string $f_{ij}$ in said text, comparing the frequencies $H(f_{ij})$ and $H(S_i)$, using the formula $\Phi_{ij} H(f_{ij}), H(S_i))=\alpha_{ij}$, and deciding, based upon the step of comparing 60 $_{ij}$ with a threshold value $\beta$, whether the possible error string $f_{ij}$ is an actual error string $F_i$.

2. A method for detecting and/or correcting an error string $F_i$ in a text using a computer system, the steps of the method comprising storing an error-free string $S_i$ and another string $F_i$ in the computer system, determining the frequency $H(S_i)$ of the corresponding error-free string $S_i$ in the text, using the frequency $H(S_i)$ to detect and/or correct the other string $F_i$ modifying the error-free string $S_i$ in accordance with a stored rule $R_j$, generating a possible error string $f_{ij}$, determining the frequency $H(f_{ij})$ of the string $f_{ij}$ in the text, comparing the frequencies $H(f_{ij})$ and $H(S_i)$, using the formula $\Phi_{ij}$ $(H(f_{ij}), H(S_i))=\alpha_{ij}$, and deciding, based on the step of comparing $\alpha_{ij}$ with a threshold value $\beta$, whether the possible error string $f_{ij}$ is an actual error string $F_i$.

3. A method including the steps of claim 2, wherein the step of modifying the string includes simulating possible error sources in the selection of the rules $R_j$ including psychological and/or technically related to the computer system.

4. A method including the steps of claim 2, wherein the step of evaluating includes using the formula $$\phi_{ij}(H(f_{ij}),H(S_i)) = \left( \frac{H(S_i)}{H(f_{ij})} \cdot \Psi \right)^{\kappa}$$

where $\Psi$ is a factor and $\kappa$ an exponent, whereby the exponent is preferably 1 or −1.

5. A method including the steps of claim 4, wherein the step of evaluating includes using a factor $\Psi$ calculated according to the formula $$\Psi=[L(S_i)]^p,$$

where $L(S_i)$ is the number of characters in the error-free string $S_j$ and p is an exponent, whereby the exponent p is preferably equal to 2 or 3.

6. A method including the steps of claim 2 wherein the method also includes using a dictionary-based method to determine valid strings $G_i$, determining whether the string $f_{ij}$ is a valid string $G_i$, using the dictionary-based method for a possible error string $f_{ij}$ having a frequency $H(f_{ij})>0$, and modifying the value $\alpha_{ij}$ of the possible error string $f_{ij}$ if the possible error string $f_{ij}$ is a valid string $G_i$.

7. A method including the steps of claim 2 further including implementing a method for automated learning by assigning to a rule $R_j$ a variable factor $\delta_j(B)$ and using that factor to modify the value $\alpha_{ij}$ of a possible error string $f_{ij}$ generated by applying the rule $R_j$.

8. A method for detecting and/or correcting error strings $F_i$ in a text, including the steps of claim 2 and further including:

a) determining the frequencies $H(Z_i)$ of different strings $Z_i$ in the text and defining those strings $Z_i$ having a frequency $H(Z_i)$ exceeding a threshold value $\delta$ are defined as error-free strings $S_i$, b) detecting an error string $F_i$ associated with an error-free string $S_i$ in accordance with the method of claim 1.

9. A method including the steps of claim 8 further including the steps of sorting and storing strings $Z_i$ with their corresponding frequencies $H(Z_i)$ in the computer system and conducting a search of the sorted strings $Z_i$ to determine the frequency $H(f_{ij})$.

10. A method including the steps of claim 9, wherein the step of storing of the strings $Z_i$ with their corresponding frequencies $H(Z_i)$ includes using a one of the methods chosen from a hashing method or a tree structure.

11. A method including the steps of claim 8, further including the step of calculating the corresponding values $\alpha_{ij}$ for various possible error strings $f_{ij}$ of various error-free strings $S_i$, and replacing those possible error strings $f_{ij}$ that are error strings $F_i$.

12. A method including the steps of claim 11, further including the steps of a) sorting the various possible error strings $f_{ij}$ according to their corresponding values $\alpha_{ij}$, and b) changing a threshold value for the values $\alpha_{ij}$ such that only those possible error strings $f_{ij}$ determined to be actual error strings are used whose value $\alpha_{ij}$ satisfies the threshold value $\beta$.

13. An apparatus including a word processing system and means for detecting and/or correcting an error string $F_i$ in a text, whereby the corresponding error-free string $S_i$ occurs in the text, the apparatus comprising:

first storage means for storing the text, second storage means for storing the frequency $H(_{Si})$ of the error-free string $_{Si}$, a processor for calculating a frequency $H(_{Si})$ of the error-free string $S_i$ using the formula $\Phi_{ij}$ $(H(f_{ij}), H(_{Si}))=\alpha_{ij}$ and for using the frequency $H(_{Si})$ in detecting and/or correcting the error string $F_{ij}$, means for storing the value $\alpha_{ij}$, a third storage means for storing the frequency $H(f_{ij})$ of a possible error string $f_{ij}$, a fourth storage means for storing a rule $R_j$, means associated with the processor for modifying the error-free string $S_i$ according to the rule $R_j$ whereby a possible error string $f_{ij}$ can be generated, means associated with the processor for determining the frequency $H(f_{ij})$ of a possible error string $f_{ij}$, means associated with the processor for comparing the frequencies $H(_{Si})$ and $H(f_{ij})$ and generating an output signal, and means associated with the processor for associating the possible error string $f_{ij}$ to the error string $F_i$ based on the output signal from the means for comparing including means for storing a threshold value $\beta$ for comparison with the value $\alpha_{ij}$.

14. The apparatus of claim 13, whereby the means for comparing the frequencies $H(_{Si})$ and $H(f_{ij})$ associated with the processor include means for computing a value $\alpha_{ij}$ in accordance with a computing rule $$\Phi_{ij}(H(f_{ij}),H(_{Si}))=\alpha_{ij}$$

and means for storing the value $\alpha_{ij}$;

and the means for associating the possible error includes means for Storing a threshold value $\beta$ for comparison with the value $\alpha_{ij}$.

15. The apparatus of claim 13 further comprising means for determining the frequency $H(Z_i)$ of different strings $Z_i$ in the text, a fifth storage means for storing the frequency $H(Z_i)$, means for storing a threshold value $\gamma$, and means for comparing the threshold value $\gamma$ with a frequency $H(Z_i)$, whereby those strings $Z_i$ having a frequency $H(Z_i)$ exceeding the threshold value $\delta$ are defined to be error-free strings $S_i$.

16. An apparatus of the type described in claim 13 further including means for character recognition, wherein the means for character recognition generates a raw text and enters the raw text into the computer system for detecting and/or correcting one or possibly more than one error string $F_i$.

17. An apparatus of the type described in claim 13 further including means for speech recognition, wherein the means for speech recognition system generates a raw text and enters the raw text into the computer system for detecting and/or correcting one or possibly more than one error string $F_i$.

* * * * *